United States Patent
Uke et al.

(10) Patent No.: US 11,252,028 B2
(45) Date of Patent: Feb. 15, 2022

(54) DISTRIBUTION OF CONTENT IN CLOUD APPLICATIONS

(71) Applicant: SAP SE, Walldorf (DE)

(72) Inventors: Sangeeta Uke, Bangalore (IN); Saiyam Modi, Madhya Pradesh (IN); Madhusudan Sahu, Bangalore (IN)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 16/789,693

(22) Filed: Feb. 13, 2020

(65) Prior Publication Data

US 2021/0258212 A1 Aug. 19, 2021

(51) Int. Cl.
*H04L 12/24* (2006.01)
*G06F 16/21* (2019.01)
*G06F 16/22* (2019.01)
*G06F 16/28* (2019.01)
*H04L 29/08* (2006.01)

(52) U.S. Cl.
CPC ........ *H04L 41/0813* (2013.01); *G06F 16/211* (2019.01); *G06F 16/2219* (2019.01); *G06F 16/289* (2019.01); *H04L 41/0853* (2013.01); *H04L 41/0863* (2013.01); *H04L 67/16* (2013.01)

(58) Field of Classification Search
CPC ............ H04L 41/0813; H04L 41/0853; H04L 41/0863; H04L 67/16; G06F 16/289; G06F 16/211; G06F 16/2219
See application file for complete search history.

(56) References Cited

U.S. PATENT DOCUMENTS

| | | | |
|---|---|---|---|
| 2018/0107586 A1* | 4/2018 | Vyas | G06F 11/14 |
| 2019/0034460 A1* | 1/2019 | Eberlein | G06F 16/285 |
| 2019/0065278 A1* | 2/2019 | Jeuk | G06F 9/45558 |
| 2020/0053087 A1* | 2/2020 | Wilson | H04L 63/10 |

\* cited by examiner

*Primary Examiner* — June Y Sison
(74) *Attorney, Agent, or Firm* — Buckley, Maschoff & Talwalkar LLC (57) ABSTRACT

Systems and methods of a configuration distribution microservice include reception of a first data structure comprising first configuration data of a first type and associated with a first tenant of a first microservice, determination of one or more other microservices associated with the first tenant and the first type of configuration data, and transmission of an instruction to the determined one or more other microservices to deploy the first configuration data.

13 Claims, 10 Drawing Sheets

CONFIGURATION MANAGER

400

Configure Order Type ▾

Standard ▾

Code:     Description

410    Adapt Filters [Go]

Delete   Create

| Order Types (7) | | | |
|---|---|---|---|
| Code | Description | Valid Start Date | Valid End Date |
| ☐ CO | Cash Order | Jan 1, 2018 | Dec 31, 2018 > |
| ☐ DO | Demo Order | Nov 1, 2019 | Nov 30, 2019 > |
| ☐ KB | Consignment Order | Jan 1, 2018 | Dec 31, 2018 > |
| ☐ LO | Limit Order | Nov 19, 2019 | Nov 22, 2019 > |
| ☐ MO | Maintenance Order | Jan 1, 2018 | Dec 31, 2018 > |
| ☐ SO | Standard Order | Jan 1, 2018 | Dec 31, 2018 > |
| ☐ TO | Test Order | Nov 1, 2019 | Nov 30, 2019 > |

Distribute Configuration

CONFIGURATION MANAGER

‹ |SAP/ Distribute and Transport Configurations ▼

Configurations                                                                 Help

400

Distribution (6)    Transport (6)

610

| Items (6) | | | Distribute | | Refresh | |
|---|---|---|---|---|---|---|
| Name | Version | | Distributed Date/Time | Status | Impacted Applications | Log |
| Payment Terms | 1.0.0 | ▼ | Jun 3, 2019, 9:43:28 PM | Complete | 2 | @ |
| Sales Group | 1.0.0 | ▼ | Jun 7, 2019, 9:43:29 PM | Complete | 2 | @ |
| Order Type | 1.0.0 | ▼ | Jun 7, 2019, 9:43:29 PM | Complete | 2 | @ |
| Pricing | 1.0.0 | ▼ | Jun 3, 2019, 9:43:29 PM | Complete | 2 | @ |
| Country Service | 1.0.0 | ▼ | Jun 7, 2019, 9:43:29 PM | Complete | 2 | @ |
| Language Service | 1.0.0 | ▼ | Jun 8, 2019, 9:43:29 PM | Complete | 2 | @ |

DISTRIBUTION OF CONTENT IN CLOUD APPLICATIONS

BACKGROUND

Modern cloud-based computing allows a user to access two or more independent applications executing in the cloud. The applications may be developed using different cloud technologies and/or may be provided by different cloud platforms using different types of compute and storage resources. Conventionally, the user maintains tenant accounts in each independent application to be accessed.

A user may wish to exchange content between two or more cloud applications. For example, it may be beneficial to use configuration information customized in one application during the execution of another application. Such configuration information may comprise configurations associated with generic application entities such as Country with SubDivision, Currency, and Language, entities associated with a controlling or "leading" application such as Employment Status, Person Type (Employee, Candidate, External), Event Types(Hire, Terminate, Rehire), and Account Type, and application-specific entities for defining process flow.

A need therefore exists for efficient and secure distribution of configuration information among disparate cloud applications.

DETAILED DESCRIPTION

The following description is provided to enable any person in the art to make and use the described embodiments. Various modifications, however, will remain readily-apparent to those in the art.

Some embodiments operate to distribute configuration data disparate microservices executing in the cloud. For example, configuration data may be stored at a microservice in association with a given tenant, and then securely distributed to and deployed at one or more other suitable microservices. Embodiments may therefore support integration and consistency among independent microservices used by a given tenant.

Figure 1:
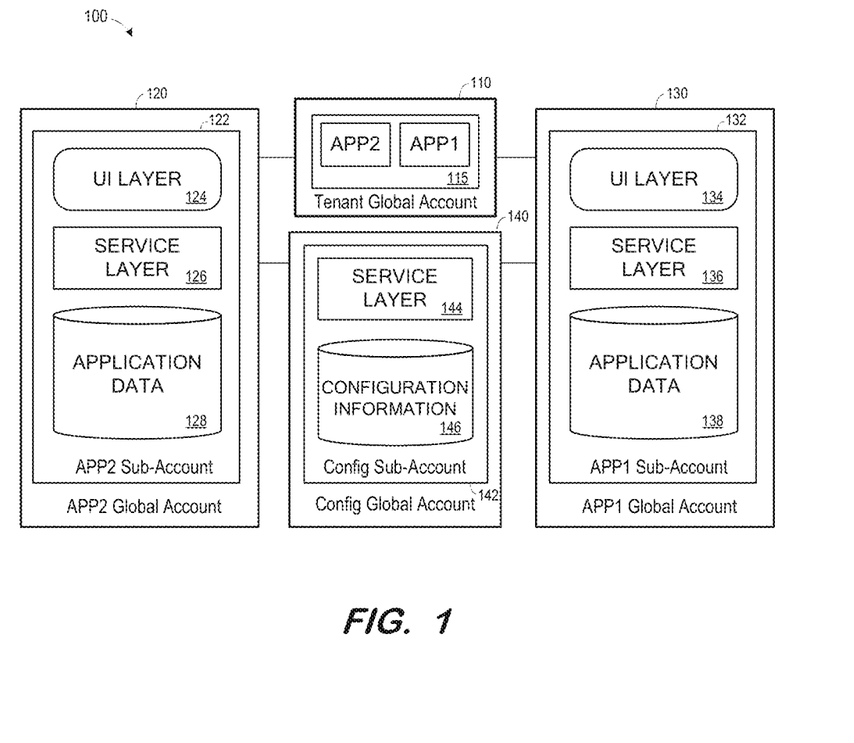
FIG. 1 illustrates a cloud architecture including a plurality of microservices and a configuration microservice according to some embodiments.

FIG. 1 illustrates architecture 100 according to some embodiments. Embodiments are not limited to architecture 100. Architecture 100 includes global accounts 110, 120, 130 and 140. Each global account represents authorization and access to resources provided by a cloud service provider as is known in the art.

For example, tenant global account 110 may include sub-account 115 through which a user may access applications (e.g., App1, App2), or microservices, to which the user subscribes. In the present example, tenant global account 110 is not associated with resources which support execution of an application within global account 110. Tenant global account 110 may therefore comprise a Software-as-a-Service (SaaS) account.

App1 global account 130 includes App1 sub-account 132. App1 sub-account 132 is a Platform-as-a-Service (PaaS) account and supports an application (i.e., microservice) App1 including user interface (UI) layer 134, service layer 136 and application data 138. App1 is an independently-executable entity in which application data 138 conforms to a database model and service layer 136 includes code to perform application logic. Service layer 136 is exposed in a manner to be consumable by any UI layer. UI layer 134, service layer 136 and application data 138 may be implemented using any respective corresponding resource types provided by the cloud platform provider of App1 global account 130.

Similarly, App2 global account 120 includes App2 sub-account 122 supporting UI layer 124, service layer 126 and application data 128. App2 is an independently-executable entity and its components may be implemented using any respective corresponding resource types provided by the cloud platform provider of App2 global account 120. For example, application data 128 may be implemented using a type of storage resource different from the type of storage resource used to implement application data 138. Moreover, code used to implement service layer 136 may conform to a different programming language than code used to implement service layer 126, and may be executed by a different number and type of virtual machines. UI layer 124 may conform to a UI framework using different code libraries than the UI framework corresponding to UI layer 134.

As mentioned above, a user may access App1 and App2 through sub-account 115. For example, a user may access a UI located at a Uniform Resource Locator associated with a provider of account 110 and log into sub-account 115 to access a UI for selecting App1 or App2. Selection of App1 allows the user to interact with App1 of sub-account 132 via UI layer 134. Such interaction may include accessing corresponding tenant data stored in application data 138.

Such tenant data may include configuration information associated with App1. For example, the user may interact with a configuration manager of UI layer 134 to modify Country configuration information of App1. The modification may add a country to a Country Code List used by App1 for the particular tenant. Data representing the modified information is provided to service layer 136 which in turn saves the data in application data 138 in a tenant-specific manner.

The user may further indicate, via a UI of UI layer 132, to distribute the modified configuration information to one or more other applications associated with the user. In response, and according to some embodiments, service layer 136 retrieves the stored tenant-specific modified information and converts the data to a generic format, such as an unstructured JSON blob. Service layer 136 transmits the converted data to service layer 144 of a configuration service executing within sub-account 142 of global account 140. Service layer 144 converts the data to another schema and stores the data in configuration information 146. Service layer 144 also determines an association between the modified configuration information and App2, and calls service layer 126 of App 2 to upload the data thereto. Service layer 126 may then convert the received data to its own tenant-specific schema and store the modified configuration information in association with the tenant in application data 128. Some embodiments may therefore facilitate operation of App2 and App1 according to a configuration which was modified by a user at App1 as described above.

Figure 2A:
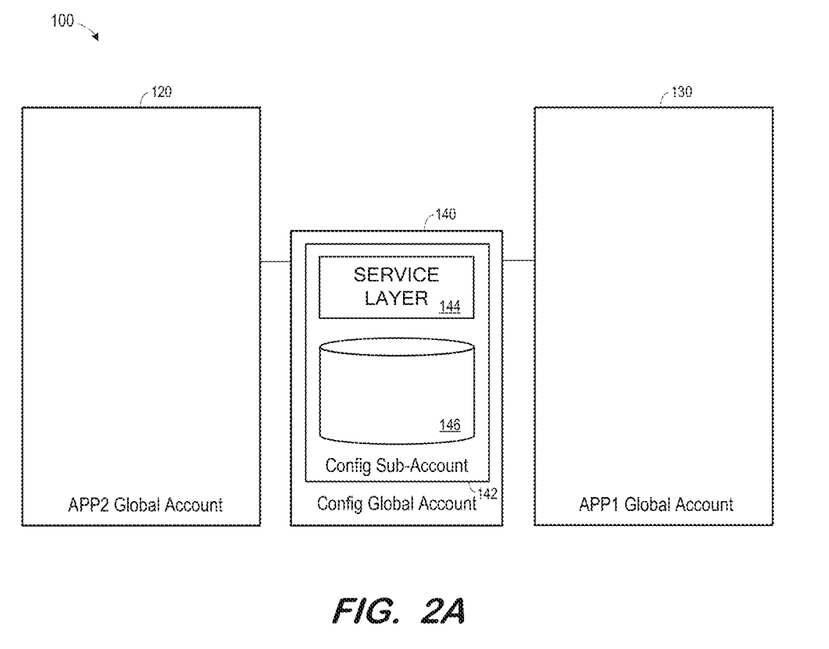
FIGS. 2A through 2C illustrate deployment of microservices according to some embodiments.
Figure 2B:
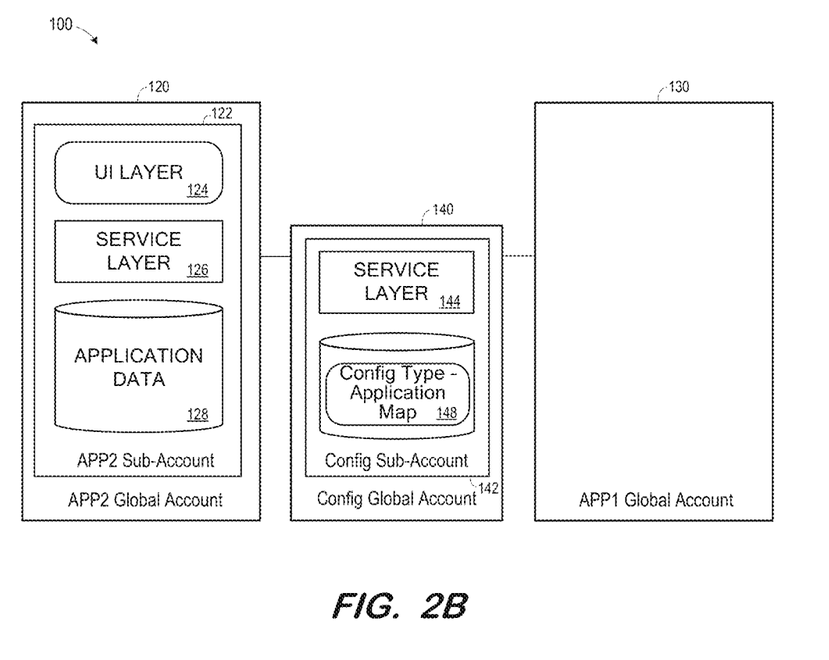
Figure 2C:
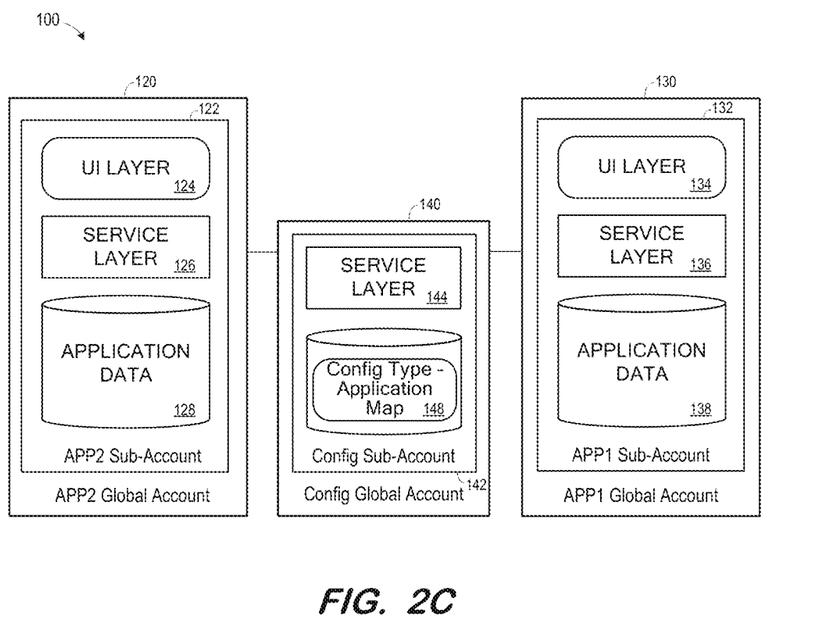

FIGS. 2A through 2C illustrate deployment of App1 and App2 of the above example. Prior to deployment, as shown in FIG. 2A, sub-account 142 of global account 140 executes a configuration microservice and global accounts 120 and 130 are ready to host PaaS sub-accounts.

It will be assumed that the App2 microservice is then deployed within sub-account 120 as shown in FIG. 2B. At deployment, service layer 126 passes configuration metadata of App2 to the configuration microservice of sub-account 142. The configuration metadata specifies the types of configuration metadata associated with App2 and service layer 142 stores these associations in configuration type-application map 148 of data 146.

FIG. 2C illustrates deployment of the App1 microservice within sub-account 132. As described above, service layer 136 passes configuration metadata specifying the types of configuration metadata associated with App1 to the configuration microservice of sub-account 142 at deployment. Service layer 142 also stores these associations in configuration type-application map 148 of data 146.

Figure 3:
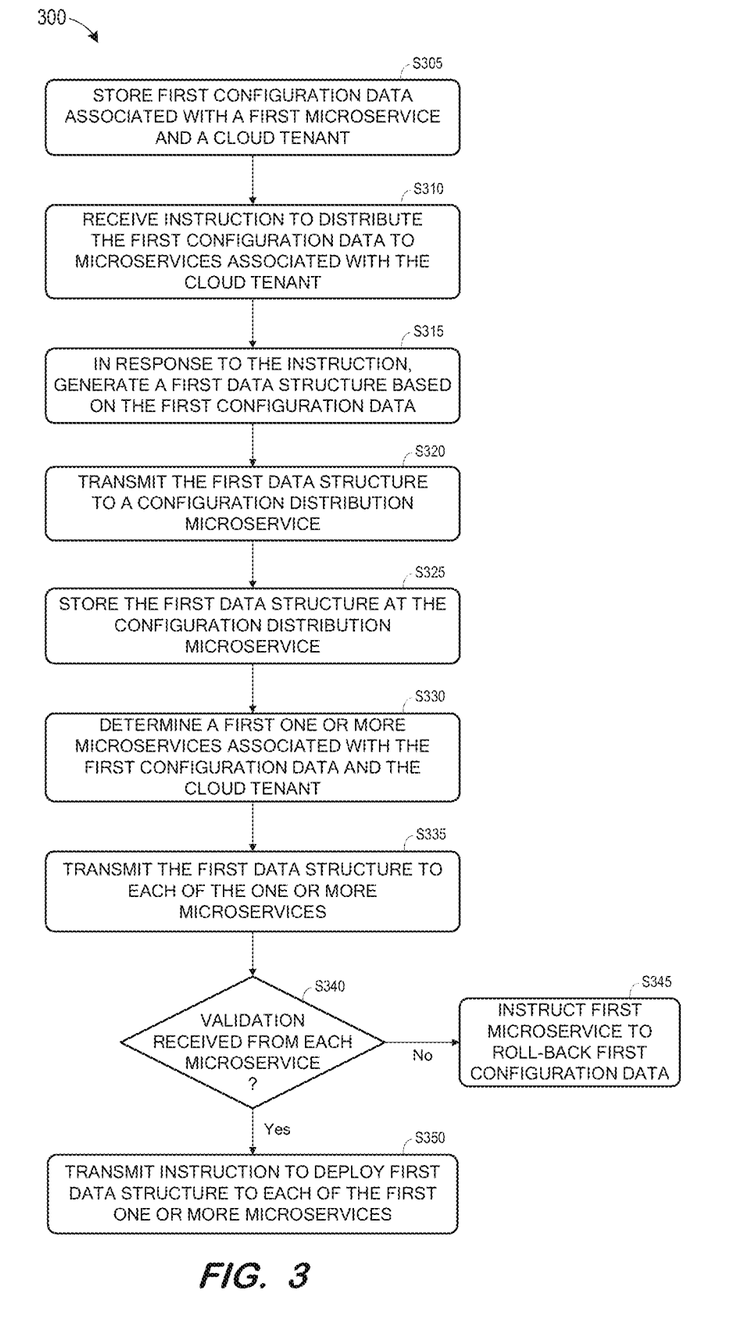
FIG. 3 is flow diagram of a process to distribute configuration data among microservices according to some embodiments.

FIG. 3 is a flow diagram of process 300 according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Prior to process 300, it will be assumed that a user has accessed a first microservice. In some embodiments, a user may access a home UI of a first microservice via a Web browser, a launchpad, or any other metaphor that is or becomes known.

Figure 4:
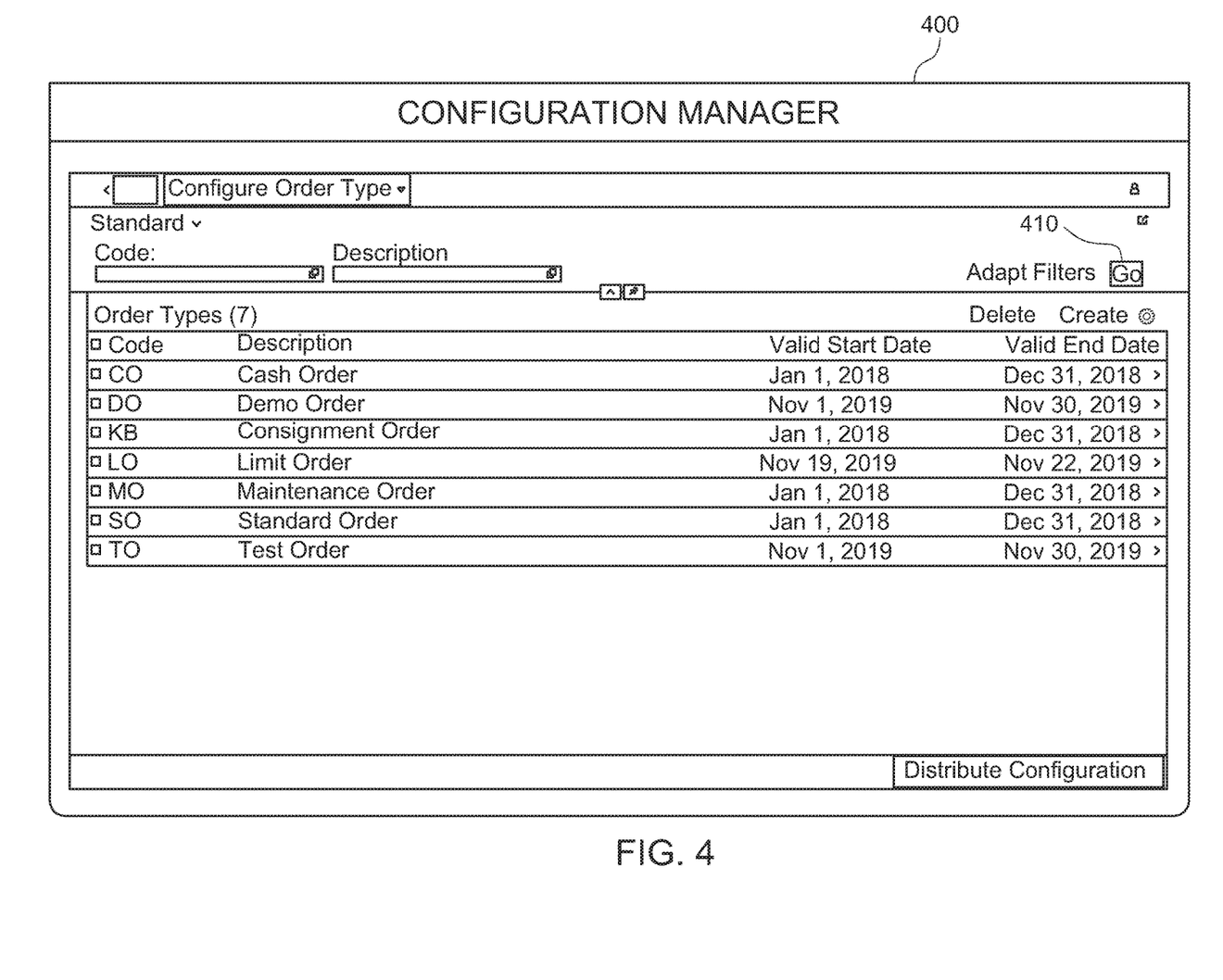
FIG. 4 is a view of a user interface to modify configuration data of a microservice and initiate configuration data distribution according to some embodiments.

At S305, first configuration data associated with the first microservice and a cloud tenant is stored. For example, a home UI of the first microservice may provide access to a configuration UI which the user may manipulate to modify configuration data. FIG. 4 shows configuration manager UI 400 according to one example. Configuration manager UI 400 allows a user to delete, create or modify Order Types which may be used within the first microservice. Selection of Go control 410 initiates storage at S305 of the configuration data by the first microservice and in association with the user's tenant. Accordingly, the first microservice will operate in view of the first configuration data when accessed by any user of the tenant.

Once the user is satisfied with the new configuration, the user may decide to distribute associated configuration data to other applications/microservices. In such a case, the user may select Distribute Configuration control 420. In response, service layer 136 calls an endpoint of the configuration microservice and flow proceeds to S315.

Figure 5:
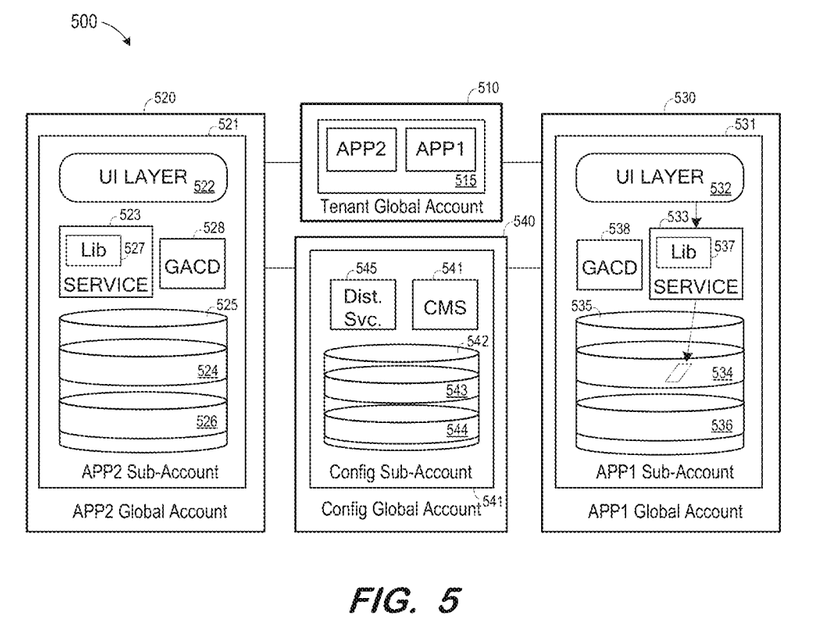
FIG. 5 illustrates storage of configuration data at a microservice within a cloud architecture including a plurality of microservices and a configuration microservice according to some embodiments.

FIG. 5 illustrates architecture 500 for describing some embodiments of process 300. Architecture 500 may comprise an implementation of architecture 100 described above, but embodiments are not limited thereto. According to the FIG. 5 example, App1 is the first microservice accessed prior to process 300. UI layer 532 may provide configuration manager UI 400 to a user logged into tenant sub-account 515. In response to selection of Go control 410, UI layer 532 passes the configuration data to service 537, which stores the configuration data in tenant-specific application data 534 of storage resource 535 in a tenant-specific schema (e.g., a designated tabular column structure). Application data 536 of storage resource 535 may be associated with a different tenant or with all tenants according to some embodiments.

Figure 6:
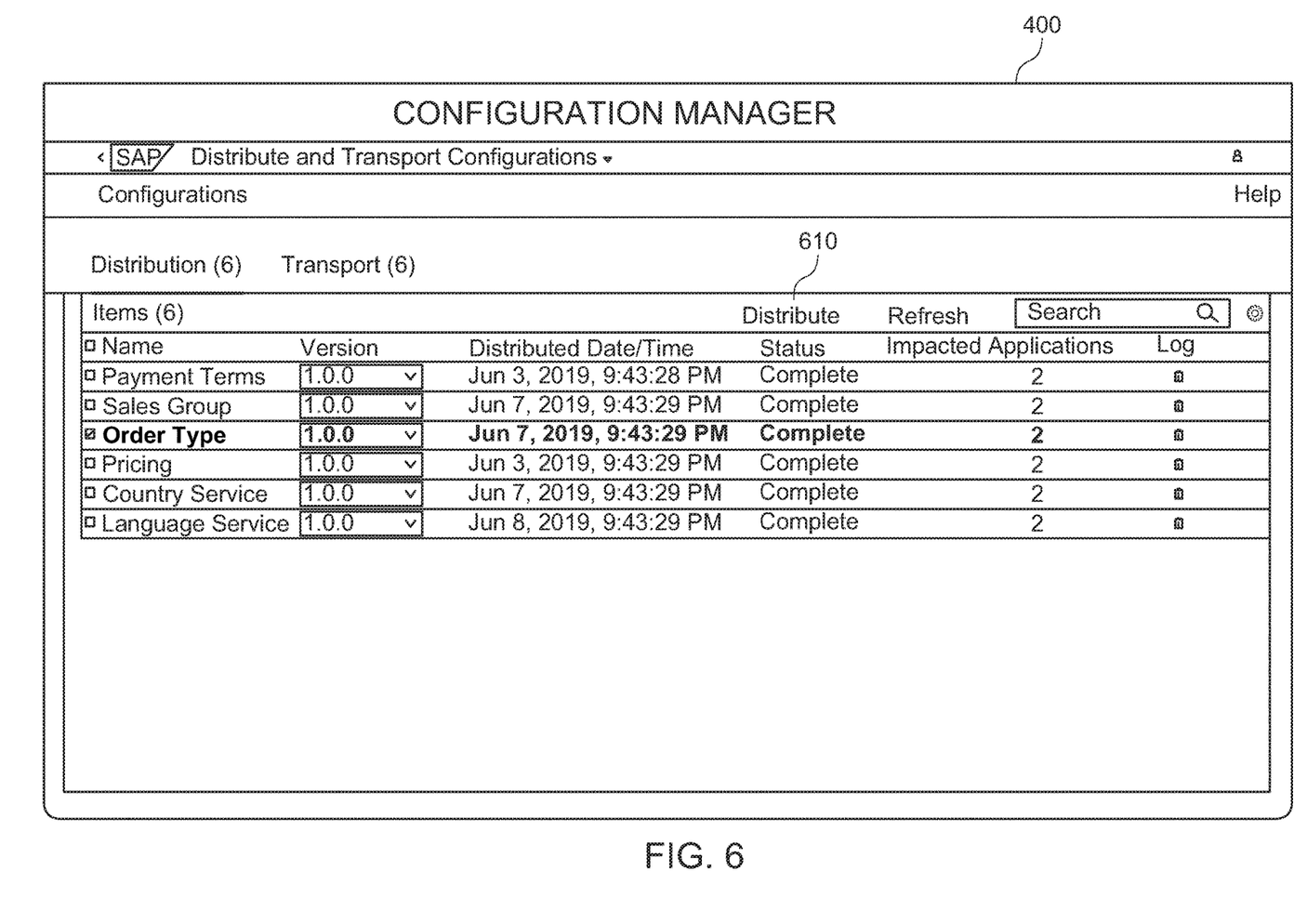
FIG. 6 is a view of a user interface to initiate distribution of one or more sets of configuration data among microservices according to some embodiments.

Returning to process 300, an instruction is received at S310 to distribute the first configuration data to microservices associated with the cloud tenant. In one example, UI layer 532 provides configuration UI 600 for specifying configuration data to distribute to other microservices to which the tenant subscribes. As shown, the user may select one or more items (i.e., configuration data) to distribute and select Distribute control 610 to initiate the instruction.

In response to the instruction, a first data structure is generated based on the first configuration data at S315. According to some embodiments, library 537 is provided for use in conjunction with the presently-described configuration service. Service 533 uses library 537 to retrieve the stored tenant-specific configuration data from data 534 and convert the data to a first data structure conforming to a generic format, such as an unstructured JSON blob. Library 537 also transmits the first data structure to a configuration distribution microservice at S320. Use of an unstructured format may assist in securing the underlying configuration data during transmission of the data structure.

Figure 7:
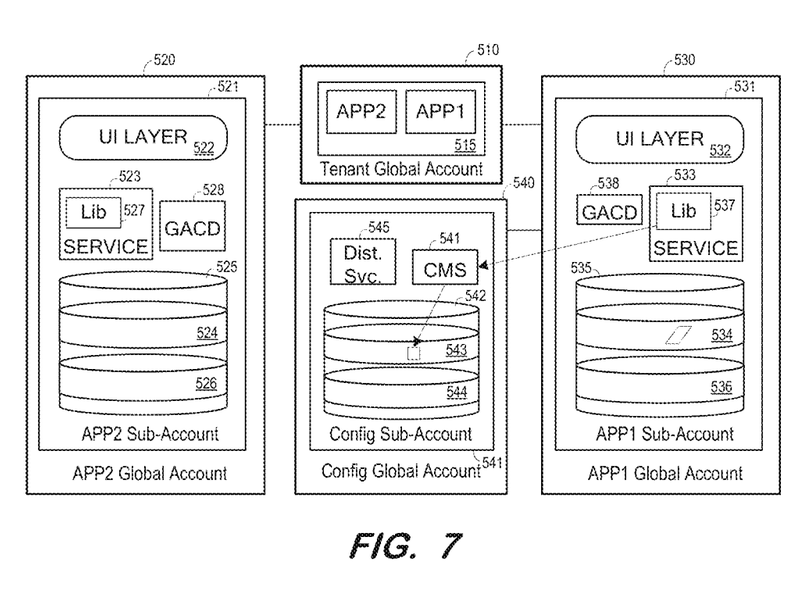
FIG. 7 illustrates storage of a data structure based on configuration data at a configuration microservice according to some embodiments.

FIG. 7 illustrates transmission of the first data structure to content management service (CMS) 541 of a configuration distribution microservice. FIG. 7 also illustrates storage of the first data structure in tenant data 543 of storage resource 542 at S325. CMS 541 may convert the first data structure to another schema prior to storage at S325.

Figure 8:
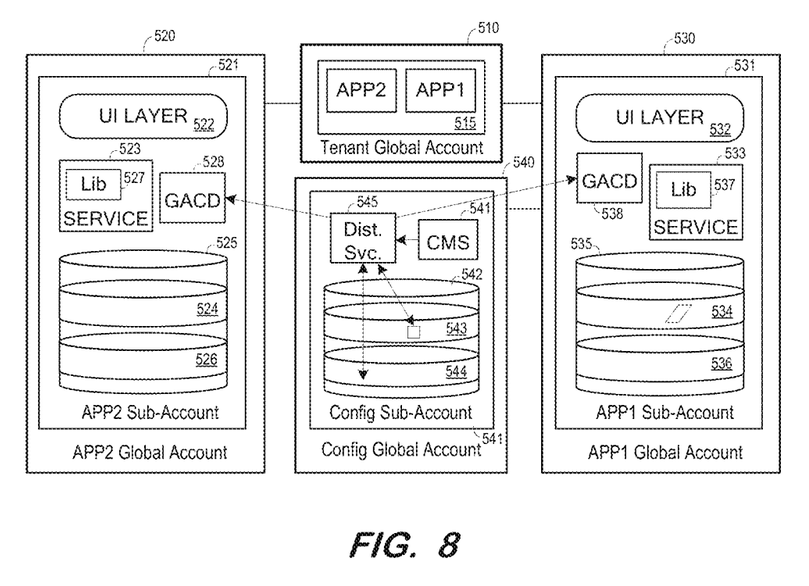
FIG. 8 illustrates distribution of a data structure based on configuration data to a plurality of microservices according to some embodiments.

CMS 541 may also trigger distribution service 545 to determine, at S330, a first one or more microservices associated with the first configuration and the cloud tenant. As described above, each microservice may provide information to the configuration distribution microservice at deployment which indicates the configuration types associated with the microservice. When a tenant subscribes to one or more microservices, the configuration distribution microservice uses this information to identify the configuration types which are common to two or more of the microservices to which the tenant subscribes. The configuration distribution microservice may then generate a rule specifying that changes made by the tenant to one of the identified configuration types should be distributed to each of the two or more microservices to which the identified configuration type is common. FIG. 8 illustrates distribution service 545 accessing such rules from data 544 of storage resource 542 to execute the determination at S330 according to some embodiments.

The first data structure is transmitted to each of the one or more determined microservices at S335. FIG. 8 also illustrates retrieval of the stored configuration data from data 543 at S335. If the configuration was reformatted prior to storage in data 543, distribution service 545 converts the retrieved configuration data back to the format (e.g., JSON blob) in which it was received. Distribution service 545 then calls general application content deployer (GACD) 528 and 530 of the determined microservices to upload the configuration thereto.

Flow pauses at S340 to wait for each microservice to validate the uploaded configuration data. If validation confirmations are not received from each microservice to which the configuration was transmitted, flow proceeds to S345 to instruct the first micro-service to roll-back the first configuration data to its prior state. The roll-back ensures that all microservices operate consistently with respect to the configuration type of the configuration data.

Figure 9:
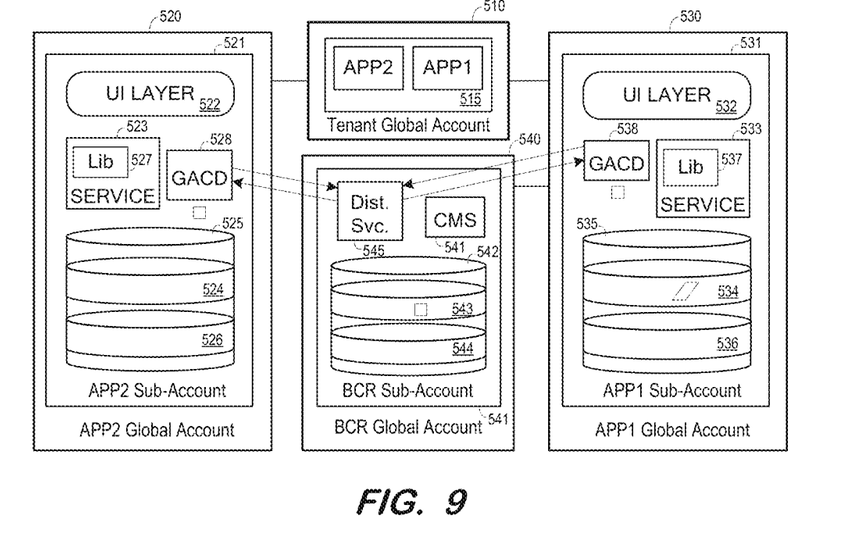
FIG. 9 illustrates reception of validations at and issuance of deployment instructions from a configuration microservice according to some embodiments.

Flow proceeds from S340 to S350 once validation confirmations are received from each microservice. At S350, an instruction is transmitted to each of the first one or more microservices to deploy the first data structure. FIG. 9 illustrates reception of validation confirmations from GACD 528 and GACD 530 and a subsequent instruction from distribution service 545 to deploy the first data structure.

Figure 10:
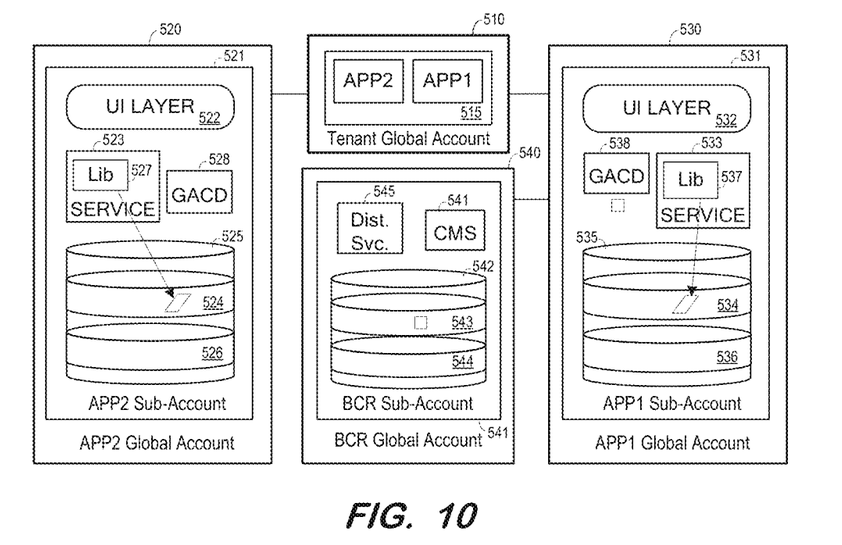
FIG. 10 illustrates deployment of configuration data at a plurality microservices according to some embodiments.

As illustrated in FIG. 10, libraries 527 and 537 deploy the data structures by converting the data structures back to their tenant-specific schema and using service 523 and service 533, respectively, to store the converted configuration data in tenant data 524 and 534.

Figure 11:
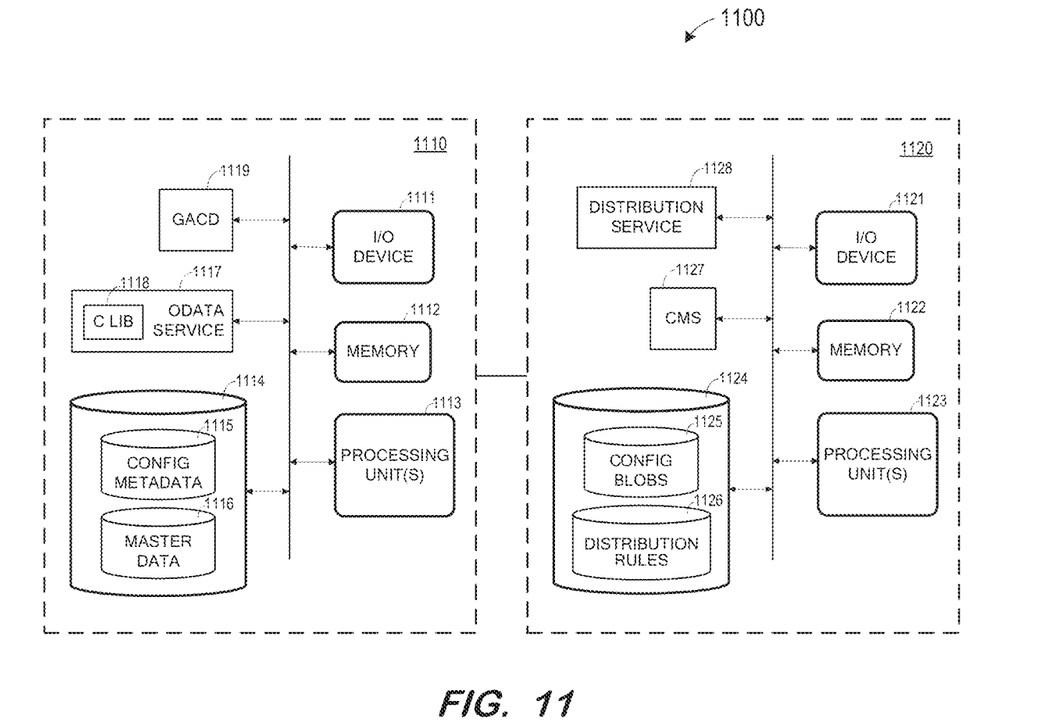
FIG. 11 is a block diagram of a multi-tenant architecture according to some embodiments.

FIG. 11 is a block diagram of system 1100 according to some embodiments. System 1100 includes microservice platform 1110 and configuration distribution microservice platform 1120. According to some embodiments, each of platforms 1110 and 1120 may communicate simultaneously with many other unshown systems. Either of platform 1110 and platform 1120 may comprise a general-purpose computing apparatus and may execute program code to perform any of the functions described herein. Platforms 1110 and 1120 may include other unshown elements according to some embodiments.

I/O devices 1111 and 1121 may comprise any suitable hardware, software and/or firmware to support the transmission and reception of data. Memory 1112 and 1122 may comprise volatile memory for storing processor-executable program code for execution by processing units 1113 and 1123, respectively, cached data, or other data.

OData service 1117 may comprise program code to implement a microservice service layer as is known in the art, and C library 1118 may comprise a library to implement functions attributed to libraries 527 and 527 above. GACD 1119 may comprise program code to implement the functions attributed to GACD 528 and 538. C library 1118 and GACD 1119 may be provided to a microservice developer for integration into a microservice to facilitate interoperation with a configuration data microservice as described herein.

Data store 1114 stores configuration metadata 1115 of the microservice, while master data 1116 includes transactional data associated with the microservice. Both configuration data 1115 and master data 1116 may be stored and utilized in a tenant-specific manner as is known in the art. All data storage mentioned herein may be provided via combinations of magnetic storage devices (e.g., magnetic tape, hard disk drives and flash memory), optical storage devices, Read Only Memory (ROM) devices, etc., while memory 1112 and 1122 may comprise Random Access Memory (RAM), Storage Class Memory (SCM) or any other fast-access memory.

CMS 1127 may comprise program code executing on platform 1120 to perform the functions described above with respect to CMS 541, while distribution service 1128 may comprise program code to perform the functions described above with respect to distribution service 545, Data store 1124 stores distribution rules 1126 which, as described above, may map types of configuration data and tenants to microservices to which the tenants subscribe and which use the configuration types. Configuration blobs 1125 comprise data structures including configuration data which are received from a microservice and distributed to other microservices based on distribution rules 1126.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a first memory storing processor-executable process steps;
   a first processor to execute the processor-executable process steps to cause the system to:
   receive a first data structure comprising first configuration data of a first type and associated with a first tenant of a first microservice;
   receive one or more configuration data types from a second microservice;
   store a first association between the one or more configuration data types and the second microservice;
   determine that the first tenant is subscribed to the second microservice; and
   in response to the determination that the first tenant is subscribed to the second microservice, store a second association between the one or more configuration data types, the second microservice and the first tenant;
   determine one or more different microservices associated with the first tenant and the first type of configuration data, wherein the determination of one or more different microservices is based on the stored second association; and transmit an instruction to the determined one or more different microservices to deploy the first configuration data.

2. A system according to claim 1, wherein the first data structure is a JSON blob.

3. A system according to claim 1, the first processor to execute the processor-executable process steps to cause the system to:

transmit the first data structure to the determined one or more different microservices; and determine that each of the one or more different microservices has validated the first data structure.

4. A system according to claim 3, the first processor to execute the processor-executable process steps to cause the system to:

if it is determined that each of the one or more different microservices has not validated the first data structure, transmit an instruction to the first microservice to roll-back the first configuration data.

5. A computer-implemented method comprising:

receiving, from a first microservice, a first data structure comprising first configuration data of a first type and associated with a first tenant of the first microservice;

receiving one or more configuration data types from a second microservice;

storing a first association between the one or more configuration data types and the second microservice;

determining that the first tenant is subscribed to the second microservice; and in response to the determination that the first tenant is subscribed to the second microservice, storing a second association between the one or more configuration data types, the second microservice and the first tenant;

determining one or more different microservices associated with the first tenant and the first type of configuration data, wherein the determination of one or more different microservices is based on the stored second association; and transmitting the first configuration data to the determined one or more different microservices; and transmitting an instruction to the determined one or more different microservices to deploy the first configuration data.

6. A method according to claim 5, wherein the first data structure is a JSON blob.

7. A method according to claim 5, further comprising:

transmitting the first data structure to the determined one or more different microservices; and determining that each of the one or more different microservices has validated the first data structure prior to transmitting the instruction.

8. A method according to claim 7, further comprising:

if it is determined that each of the one or more different microservices has not validated the first data structure, transmitting an instruction to the first microservice to roll-back the first configuration data.

9. A system comprising:

a first memory storing processor-executable process steps;

a first processor to execute the processor-executable process steps to provide:

a first microservice comprising a first user interface layer to receive an instruction from a first tenant to create first configuration data of a first type and associated with the first tenant, a first storage layer, and a first service layer to create a first data structure conforming to a first schema and store the first data structure in the first storage layer, the first user interface layer to receive a second instruction from the first tenant to distribute the first configuration data and, in response to the second instruction, the first service layer to generate a second data structure comprising the first configuration data based on the first data structure, and to transmit the second data structure;

a second microservice comprising a second user interface layer, a second storage layer, and a second service layer to receive the second data structure from the configuration distribution microservice and deploy the first configuration data; and a configuration distribution microservice to:

receive the transmitted second data structure;

store a first association between a first one or more configuration data types of the first microservice and the first microservice;

store a second association between a second one or more configuration data types of the second microservice and the second microservice;

determine that the first tenant is subscribed to the first microservice;

store, in response to the determination that the first tenant is subscribed to the first microservice, a third association between the first one or more configuration data types, the first microservice and the first tenant;

determine that the first tenant is subscribed to the second microservice;

store, in response to the determination that the first tenant is subscribed to the second microservice, a fourth association between the second one or more configuration data types, the second microservice and the first tenant;

determine, based on the third association and the fourth association, one or more different microservices associated with the first tenant and the first type of configuration data;

transmit the second data structure to the determined one or more different microservices; and transmit an instruction to the determined one or more different microservices to deploy the first configuration data.

10. A system according to claim 9, wherein the second data structure is a JSON blob.

11. A system according to claim 9, the configuration distribution microservice to:

determine that each of the one or more different microservices has validated the second data structure prior to transmission of the instruction to deploy the first configuration data of the second data structure.

12. A system according to claim 11, the configuration distribution microservice to:

if it is determined that each of the one or more different microservices has not validated the first data structure, transmit an instruction to the first microservice to roll-back the first configuration data.

13. A system according to claim 9, the configuration distribution microservice to:

receive the first one or more configuration data types from the first microservice; and receive the second one or more configuration data types from the second microservice.

\* \* \* \* \*